United States Patent [19]
Sawada

[11] Patent Number: 5,584,543
[45] Date of Patent: Dec. 17, 1996

[54] AUTOMOTIVE BRAKE FLUID PRESSURE CONTROL APPARATUS

[75] Inventor: Mamoru Sawada, Yokkaichi, Japan

[73] Assignee: Nippondenso Co., Ltd., Kariya, Japan

[21] Appl. No.: 516,983

[22] Filed: Aug. 18, 1995

[30] Foreign Application Priority Data

Aug. 26, 1994 [JP] Japan ................... 6-202229

[51] Int. Cl.$^6$ .................................. B60T 13/10
[52] U.S. Cl. ............................ 303/191; 303/156
[58] Field of Search .................... 303/139, 145, 303/156, 157, 158, 191, 1, 116.1

[56] References Cited

U.S. PATENT DOCUMENTS

| | | | |
|---|---|---|---|
| 3,887,240 | 6/1975 | Leiber et al. | 303/156 |
| 4,583,611 | 4/1986 | Frank et al. | |
| 5,188,433 | 2/1993 | Reinartz et al. | |
| 5,454,629 | 10/1995 | Johnson | 303/156 |

FOREIGN PATENT DOCUMENTS

| | | |
|---|---|---|
| 3709189 | 9/1988 | Germany . |
| 3729183 | 3/1989 | Germany . |
| 4019347 | 1/1992 | Germany . |
| 4031318 | 4/1992 | Germany . |
| 4107978 | 9/1992 | Germany . |
| 6-87426 | 3/1994 | Japan . |
| 91/04893 | 4/1991 | WIPO . |
| 9102352 | 8/1992 | WIPO . |

OTHER PUBLICATIONS

Patent Abstracts of Japan, vol. 940 No. 011, Nov. 1994, re JP-A 06 312655.
Patent Abstracts of Japan, vol. 055, No. 108 (M–078), May 1981, re JP-A 56 050836.
Patent Abstracts of Japan, vol. 016 No. 331 (M–1282) Jul. 1992, re JP-A 04 095557.

*Primary Examiner*—Lee W. Young
*Attorney, Agent, or Firm*—Cushman, Darby & Cushman

[57] ABSTRACT

Temperature of brake fluid is estimated, and a pressure-increase gradient change ratio Pup, a pressure-reduction gradient change ratio Pdw, and pump-discharge gradient change quantity Ppmp in correspondence with an amount of decline in pump-discharge capacity at the estimated brake-fluid temperature are calculated respectively. These compensation multipliers Pup, Pdw, and Ppmp are variables for obtaining a pressure-increase gradient change ratio, pressure-reduction gradient change ratio, and pump-discharge gradient change quantity identical to a time of normal temperature (i.e., a time of normal temperature when pump-discharge capacity has not declined). Accordingly, a pressure-increase time Tup and pressure-reduction time Tdw in ABS control and TRC control are calculated utilizing these compensation multipliers to obtain control performance of brake-fluid pressure similar to a time of normal temperature.

4 Claims, 8 Drawing Sheets

AUTOMOTIVE BRAKE FLUID PRESSURE CONTROL APPARATUS

CROSS REFERENCE TO RELATED APPLICATION

This application is based upon and claims priority from Japanese Patent Application No. Hei 6-202229 filed Aug. 26, 1994, the contents of which are incorporated herein by reference.

BACKGROUND OF THE INVENTION

1. Field of the Invention

The present invention relates to an automotive brake fluid pressure control apparatus employed in brake pressure control, for example in traction control during acceleration slippage and in antiskid control during braking operation, to cause to enhance motion characteristic of a vehicle.

2. Related Art

Conventionally, as shown for example in FIG. 7, a hydraulic circuit of a structure which drives hydraulic pumps P1 and P2 with a hydraulic motor MR has been considered as a hydraulic circuit of an automotive brake fluid pressure control apparatus employed in traction control during acceleration slippage or the like.

This hydraulic circuit performs the traction control for a vehicle (FF) of a front-wheel drive and a front-mounted engine, and valves and the like to perform normal braking (in response to depression of a brake pedal BP by a driver) and the traction control are disposed in a conduit of brake fluid reaching from a master cylinder (M/C) to wheel cylinders (W/C) of left and right front wheels FL and FR. In specific terms, this includes a master-cylinder cutoff valve (SM valve) which cuts off brake fluid from the M/C, a reservoir cutoff valve (SR valve) which cuts off communication from a reservoir R on the M/C side to the intake side of the hydraulic pumps P1 and P2, and additionally electromagnetic-type valves V1 and V2 which perform holding and release of high-pressure brake-fluid pressure applied to the W/Cs.

Accordingly, in a case of executing traction control with this hydraulic circuit (hereinafter described with reference to the FL wheel), braking force is controlled by performing holding and release of brake-fluid pressure with the hydraulic control valves V1 and V2 in a state after the conduit has been interrupted by the SM valve and moreover the conduit has been communicated by the SR valve, and along with this, a motor relay MR has been switched on to drive the hydraulic pump P1, which takes in the W/C-side brake fluid to rise pressure thereof. The hydraulic control valve V1 is a pressure-increasing valve which is switchable to a pressure-increasing position to communicate the conduit and to a holding position to interrupt the conduit, and the other hydraulic control valve V2 is a pressure-reducing valve which is switchable to a pressure-reducing position to communicate the conduit in order to expel brake fluid within the W/C and to a holding position to interrupt the conduit.

The pressure-increasing valve V1 is normally at the pressure-increasing position, and an electromagnetic solenoid thereof is driven by conductance from a brake controller (not illustrated) and switched to the holding position. Additionally, the pressure-reducing valve V2 is normally in an interrupted state, and an electromagnetic solenoid thereof is driven by conductance from the brake controller to change into a communicated state and expel brake fluid within the W/C. In this way, three modes—i.e., pressure-increasing, holding, and pressure-reducing—can be switched by the brake controller.

Accordingly, as is disclosed, for example, in Japanese Patent Application Laid-open No. 60-56662 as control of brake-fluid pressure, in a case of pressure increase, a ratio of time to increase pressure of brake fluid per a uniform time is determined in accordance with an amount of change in vehicle-wheel slippage, and duty control where the pressure-increasing valve is repeatedly switched between the pressure-increasing position and holding position in accordance with the ratio of time is performed and thus the brake fluid pressure is increased. Simultaneously, in a case of pressure reduction, a ratio of time to reduce pressure of brake fluid per a uniform time is determined in accordance with an amount of change in vehicle-wheel slippage, and duty control where the pressure-reducing valve is repeatedly switched between the pressure-reducing position and holding position in accordance with the ratio of time is performed and thus brake fluid pressure is reduced.

However, in a case of attempting to initiate the traction control, for example, at a time of low temperature, there existed a problem wherein traction control could not be performed favorably due to a reason of worsening of discharge capacity of the pump P1 and insufficiency of amount of fluid discharge or the like. This problem will be described with reference to FIG. 8. FIG. 8 is a time chart indicating a state of a motor relay MR to cause to drive a pump P, a state (herein either of three modes of pressure increase, holding, or pressure reduction) of the electromagnetic solenoid to cause to drive the pressure-increasing valve V1 and pressure-reducing valve V2, and brake-fluid pressure of a wheel cylinder.

Briefly, because viscous resistance increases at a time of low temperature, discharge capacity of the pump P1 worsens and resistance when brake fluid passes through a needle valve becomes large, and so when a time of pressure increase is considered, an actual amount of increase in brake-fluid pressure is small even when in a pressure-increasing mode for a pressure-increasing time identical to when at a normal temperature. In the time chart of brake-fluid pressure in FIG. 8, a solid line indicates when at a normal temperature and a broken line indicates when at a low temperature. As is understood from these, the pressure-increase gradient becomes smaller and convergence of slippage deteriorates as a result. Additionally, when time at normal temperature (solid line) and time at a low temperature (broken line) even during pressure reduction are compared, not unexpectedly the pressure-reduction gradient of brake-fluid pressure at a time of low temperature even when in the pressure-reducing mode is small for the same pressure-reduction time, and speed loss due to delay in brake-fluid pressure reduction occurs.

Additionally, as a cause of worsening of discharge capacity of the hydraulic pump P1 when at a low temperature, not only the increase in viscous resistance of brake fluid but also, for example, the decline of a battery voltage can be considered. That is, the hydraulic pump P1 is driven by a battery, if battery voltage declines due to low temperature, discharge capacity not unexpectedly worsens.

SUMMARY OF THE INVENTION

In view of the above problems of the prior art, it is an object of the present invention to obtain braking performance similar to a normal time in a brake fluid pressure control apparatus employed to control brake fluid pressure and cause to enhance motion characteristics of a vehicle such as traction control or antiskid control, even if the pressure-increase and pressure-reduction characteristics of brake-fluid pressure change, as a result that pump discharge performance worsens, or resistance increases when brake fluid with elevated viscous resistance passes through a conduit because of low temperature or the like.

An automotive brake fluid pressure control apparatus according to the present invention can supply high-pressure brake fluid discharged from a pump to a wheel cylinder of a vehicle wheel and cause to expel brake fluid from the wheel cylinder by controlling switching of a pressure-control valve by a brake-fluid pressure control device. In this way, switching of the pressure-control valve is controlled and brake-fluid pressure applied to the wheel cylinder is controlled.

Accordingly, a brake-fluid pressure control compensation device compensates switching control of the pressure-control valve so that supply time of brake fluid to the wheel cylinder and/or expulsion time of brake fluid from the wheel cylinder becomes longer when increase in viscous resistance of brake fluid or decline in discharge capacity of the pump has been detected.

When, for example, at a time of low pressure, the discharge capacity of the pump may drop or conduit-passage resistance of brake fluid for which viscous resistance has increased due to low temperature may become larger, and a pressure-increase or pressure-reduction gradient of brake-fluid pressure becomes smaller. However, because control of the pressure-control valve is compensated in accordance with the amount of decline of the pressure-increase or pressure-reduction gradient and control of brake-fluid pressure is performed, appropriate brake-fluid pressure control similar to a normal time when the discharge capacity of the pump has not declined and viscous resistance of brake fluid has not increased can be performed.

The brake-fluid pressure control compensation device detects, for example, an actual amount of discharge of the pump per a unit time, and can also detect a decline in discharge capacity of the pump by comparing the actual amount thereof with a value of a normal time, but is provided with a brake-fluid temperature detection device and can also estimate an increase in viscous resistance of brake fluid on a basis of temperature of brake fluid detected by this brake-fluid temperature detection device. In this case, a relationship between temperature of brake fluid and the increase in viscous resistance of brake fluid is stored in a format of a map or the like, and detection is facilitated by referencing this map or the like so as to estimate pressure-increase and pressure-reduction characteristics.

This brake-fluid temperature detection device is provided with an engine coolant-water temperature detection device, and it is also possible to estimate brake-fluid temperature on a basis of temperature of coolant water detected thereby. This is preferred because coolant-water temperature is frequently also used for other control in a vehicle, and joint use of data is possible.

Furthermore, when a case is such that the pressure-control valve is in a format switchable to three modes of pressure increase, holding, or pressure reduction, the brake-fluid pressure control device determines time to increase pressure of brake fluid per a uniform time during pressure increase control, and causes the pressure-control valve to perform duty control between the pressure-increasing mode and holding mode in accordance with the time thereof, the larger the amount of decline of discharge capacity is, the larger the brake-fluid pressure control device sets the duty ratio compared to normal duty ratio, and thereby time in which the pressure-control valve is switched to the pressure-increase mode becomes long.

In this way, even if an amount of pressure increase (or reduction) of brake-fluid pressure per unit time decreases due to worsening of pump discharge capacity and in particular an increase in passage resistance of brake fluid in a needle valve, control characteristics of brake-fluid pressure similar to a normal time can be obtained by lengthening the time of the pressure-increase (or -reduction) mode.

Furthermore, according to the present invention, brake-fluid pressure applied to the several vehicle wheels during vehicle braking is regulated by the brake-fluid pressure control device, and antiskid control to prevent occurrence of excessive slippage in the respective vehicle wheels can be performed.

Still further, according to the present invention, in addition to the above-described antiskid control, brake-fluid pressure applied to the several vehicle wheels during vehicle acceleration is regulated by the brake-fluid pressure control device, and traction control to prevent occurrence of excessive slippage in the respective vehicle wheels can be performed.

In this way, in a case of performing antiskid control and traction control, there exist a predetermined pressure-increase pattern and pressure-reduction pattern which presupposes normal pressure-increase and pressure-reduction characteristics, for example, at a time of normal temperature, and brake pressure control is performed on a basis of the pattern thereof (in a case of the above-described duty control, a duty-ratio pattern or the like). However, in a case where a pressure-increase or pressure-reduction gradient has become small due to a decline in pump discharge performance or the like, the pressure-increase gradient or pressure-reduction gradient can be made equivalent to a time of normal temperature by, for example, making the duty ratio larger and making the pressure-increase time and pressure-reduction time greater. For example wheel-locking avoidance performance of initial antiskid control is thereby improved, and in addition to this, braking performance similar to a time of normal temperature can be obtained even at a time of low temperature.

Additionally, the foregoing traction control signifies control to automatically apply braking force to a wheel cylinder in a case where for example acceleration slippage has occurred.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings

DETAILED DESCRIPTION OF THE PREFERRED EMBODIMENTS

Embodiments according to the present invention will be described hereinafter with reference to the drawings.

Figure 1:
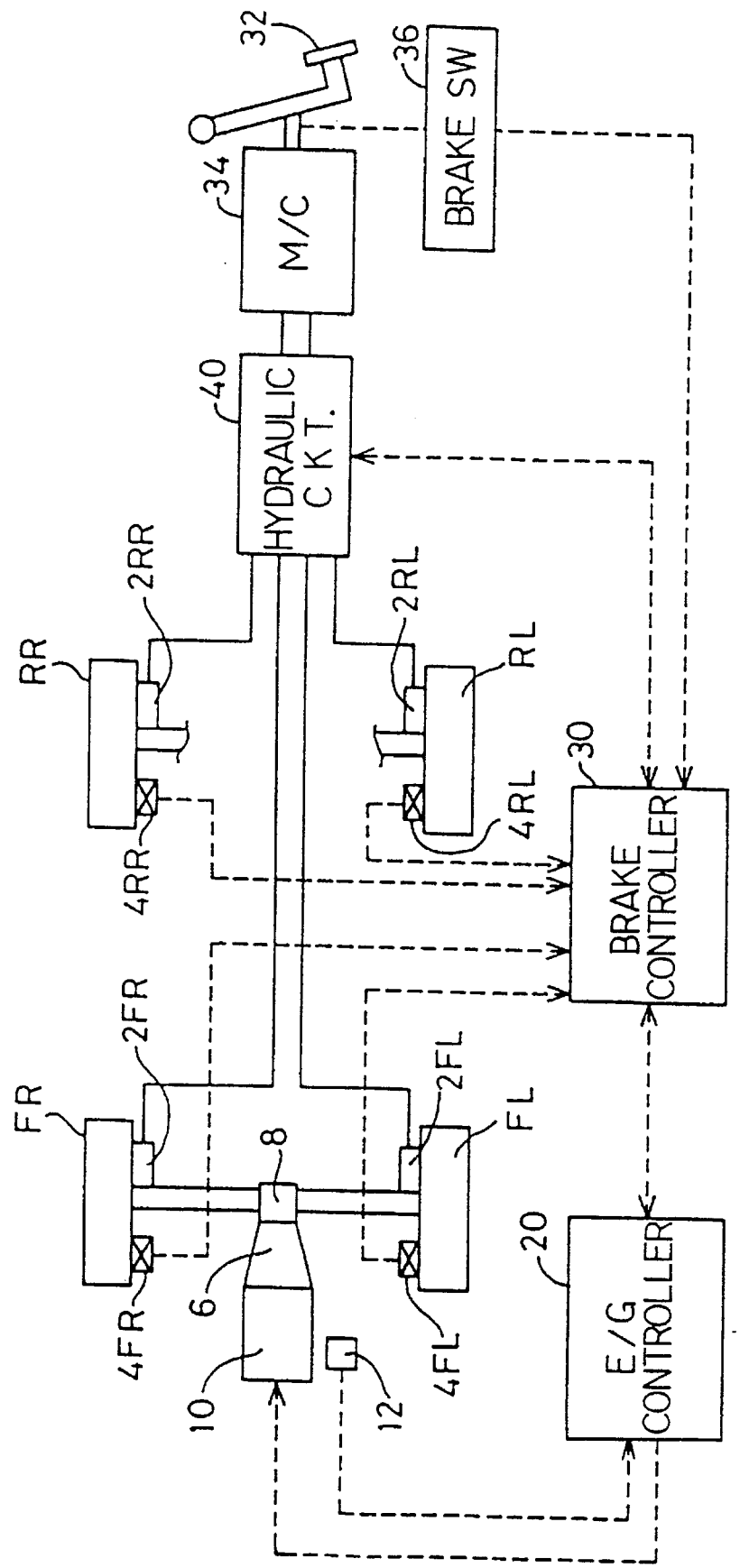
FIG. 1 is a schematic structural view indicating an overall structure of a vehicle control system according to an embodiment of the present invention.

Firstly, FIG. 1 is a schematic structural view indicating an overall structure of a control system of a vehicle in which the present invention is applied. The present embodiment applies the present invention in a front-engine, front-drive (FF) four-wheel vehicle, and uses as a hydraulic pump a self-suction pump to take in brake fluid from a master cylinder (hereinafter termed "M/C") and return brake fluid to the M/C.

As shown in FIG. 1, several wheels (front left wheel FL, front right wheel FR, rear left wheel RL, and rear right wheel RR) of the vehicle are respectively provided with wheel cylinders (hereinafter termed "W/Cs") 2FL, 2FR, 2RL, and 2RR to apply braking force to the several wheels FL to RR, as well as with speed sensors 4FL, 4FR, 4RL, and 4RR to detect rotating speed of the several wheels. Additionally, the left and right front wheels which are the driving wheels (hereinafter termed simply "driving wheels") FL and FR receive drive force from an internal combustion engine 10 connected via a gearbox 6 and differential gear 8, and rotate. This internal combustion engine 10 which becomes the power source is provided with a sensor array 12 to detect a running state of rotating speed, amount of intake air, coolant-water temperature, degree of opening of a throttle valve (throttle degree of opening), and the like thereof. Accordingly, signals from this sensor array 12 are input to an engine (E/G) controller 20, and the E/G controller 20 controls the amount of fuel injection and ignition timing of the internal combustion engine 10 on the basis of the signals.

Additionally, the signals from the speed sensors 4FL to 4RR disposed at the several wheels FL to RR are input to a brake controller 30. By controlling several electromagnetic valves within a hydraulic circuit 40 provided in a hydraulic path extending from an M/C 34 to supply brake fluid to the W/Cs 2FL to 2RR of the several wheels FL to RR according to depression of a brake pedal 32, this brake controller 30 executes antiskid control (hereinafter termed "ABS control") and traction control (hereinafter termed "TRC control") to suppress slippage occurring in the wheels during vehicle braking and vehicle acceleration. Other than the signals from the above-described several speed sensors 4FL to 4FR, the brake controller 30 operates according to signals received from a brake switch (hereinafter termed "brake SW") 36 which assumes an ON state when the brake pedal 32 is operated, a pressure sensor not illustrated which is disposed within the hydraulic circuit 40 and detects hydraulic pressure within the W/Cs 2FL and 2FR of the driving wheels FL and FR, and so on.

The E/G controller 20 and brake controller 30 are respectively composed of a microcomputer structured primarily of a CPU, ROM, RAM, and the like, and these controllers 20 and 30 are provided with communication devices to transmit and receive detection data from sensors, control data, and so on.

The hydraulic circuit 40 will be described next.

Figure 2:
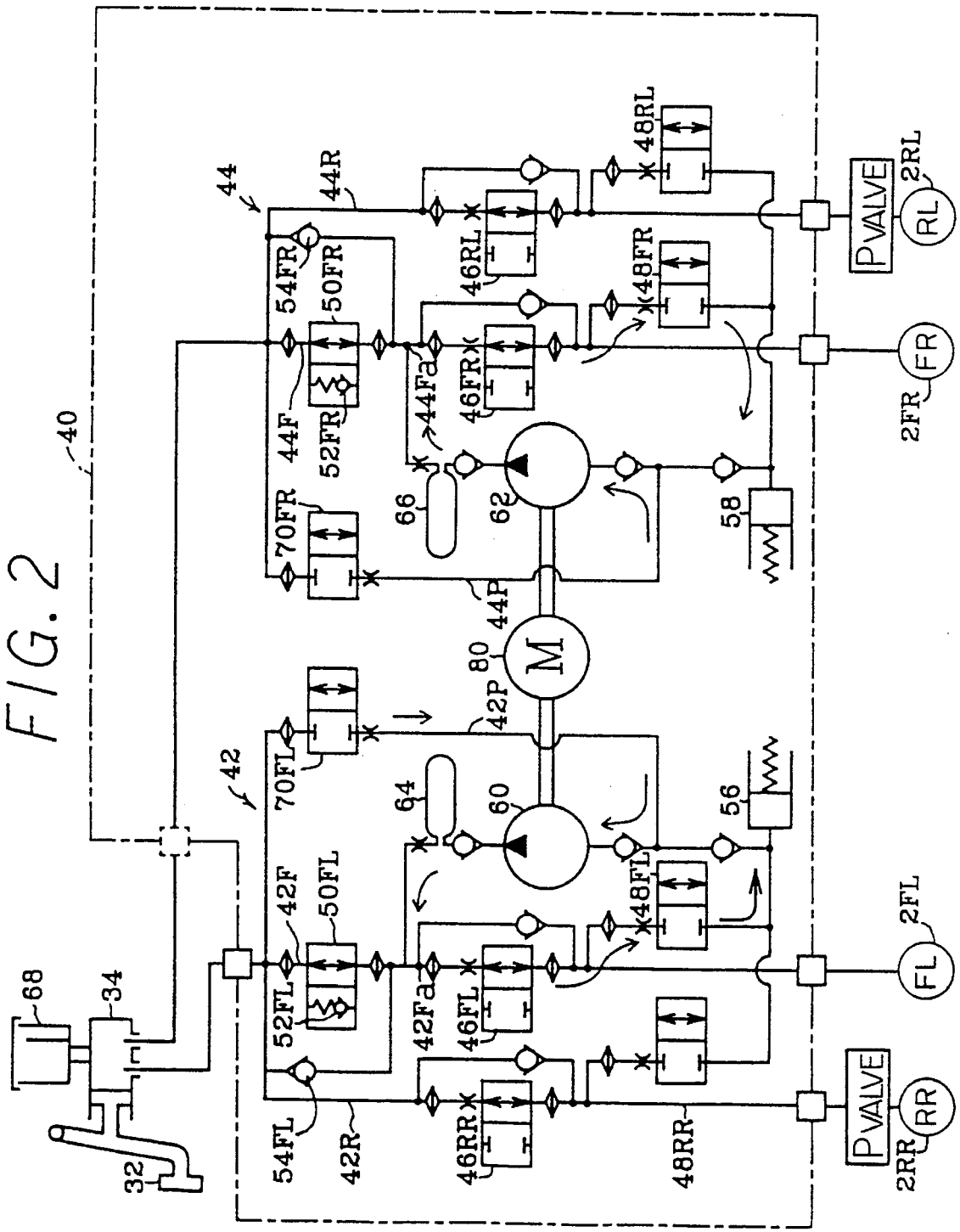
FIG. 2 is a circuit diagram indicating a structure of a hydraulic circuit according to the embodiment.

As shown in FIG. 2, the hydraulic circuit 40 is provided with dual-system hydraulic paths 42 and 44 to supply brake fluid sent under pressure from two hydraulic paths of the M/C 34 to the front-left wheel FL and rear-right wheel RR and to the front-right wheel FR and rear-left wheel RL, respectively. Accordingly, of these hydraulic paths 44 and 42, holding valves (pressure-increasing control valves) 46RL and 46RR which are switchable to a pressure-increasing position in which the paths 44R and 42R are communicated and to a holding position in which the paths 44R and 42R are interrupted as well as pressure-reducing valves (pressure-reducing control valves) 48RL and 48RR to expel brake fluid within the respective W/Cs 2RL and 2RR are provided in the hydraulic paths 44R and 42R reaching the W/Cs 2RL and 2RR of the left and right rear wheels which are driven wheels (hereinafter termed simply "driven wheels") RL and RR.

Moreover, the pressure-increasing valves 46RL and 46RR normally are set to pressure-increasing positions, and are switched to holding positions by electrical conduction from the brake controller 30. Additionally, the pressure-reducing valves 48RL and 48RR are normally set to interrupted positions, and are switched to communicated positions to expel brake fluid within the W/Cs 2RL and 2RR by electrical conduction from the brake controller 30.

Meanwhile, of the foregoing respective hydraulic paths 42 and 44, the pressure-increasing valves 46FL and 46FR and pressure-reducing valves 48FL and 48FR are provided in the hydraulic paths 42F and 44F reaching the W/Cs 2FL and 2FR of the left and right front wheels which are the driving wheels FL and FR, similarly to the hydraulic paths 44R and 42R of the driven wheel side; along with this, master-cylinder cut-off valves (SM valves) 50FL and 50FR are disposed at the M/C 34 side of the respective holding valves 46FL and 46FR to communicate and interrupt the paths 42F and 44F.

An interrupted position of these SM valves 50FL and 50FR is a position communicated when hydraulic pressure of the pressure-increasing valve 46FL and 46FR side has become an upper-limit value or more which is the value adding a predetermined value with respect to hydraulic pressure of the M/C 34 side, established at relief valves 52FL and 52FR to limit hydraulic pressure of the pressure-increasing valve 46FL and 46FR side to the upper-limit value or less.

Accordingly, relief valves 54FL and 54FR which are communicated when hydraulic pressure of the M/C 34 side has become larger than hydraulic pressure of the pressure-increasing valve 46FL and 46FR side and which supply pressurized fluid output from the M/C 34 to the pressure-increasing valve 46FL and 46FR side are connected in parallel with these SM valves 50FL and 50FR. The SM valves 50FL and 50FR normally are set to communicated position, and are switched to interrupted position by electrical conduction from the brake controller 30.

Additionally, reservoirs 56 and 58 which temporarily accumulate brake fluid expelled from the pressure-reducing valves 48FL to 48RR are provided in the hydraulic paths 42 and 44, and pumps 60 and 62 which pressurize and send the brake fluid thereof to a hydraulic path 42Fa between the SM valve 50FL and pressure-increasing valve 46FL and to a hydraulic path 44Fa between the SM valve 50FR and pressure-increasing valve 46FR, respectively, are also provided. Accumulators 64 and 66 to suppress internal hydraulic pulsation are disposed in discharge paths of brake fluid from the respective pumps 60 and 62.

Furthermore, brake-fluid supply paths 42P and 44P to supply brake fluid directly to the pumps 60 and 62 from a reservoir 68 provided in an upper portion of the M/C 34 via the M/C 34 during execution of brake TRC control which will be described later are provided in the respective hydraulic paths 42 and 44; provided in these brake-fluid supply paths 42P and 44P are reservoir-cutoff valves (SR valves) 70FL and 70FR to communicate and interrupt the paths thereof.

The SR valves 70FL and 70FR normally are set to an interrupted position, and are switched to a communicated position by electrical conduction from the brake controller 30. In addition, the respective pumps 60 and 62 are driven via a motor 80 during execution of brake TRC control and ABS control described later.

ABS control and TRC control performed by the above-described brake controller 30 will be described hereinafter.

In a case where ABS control and TRC control are not performed, normally all electromagnetic valves of the hydraulic circuit 40 go off. In specific terms, the SM valves 50FL and 50FR are at communicated positions and the SR valves 70FL and 70FR are at interrupted positions as electromagnetic valves to switch to TRC control, and the pressure-increasing valves 46FL and 46FR are at communicated positions and the pressure-reducing valves 48FL and 48FR are at interrupted positions as the pressure-control valves for the W/Cs 2FL and 2FR of the driving wheels.

(1) ABS control

Figure 3:
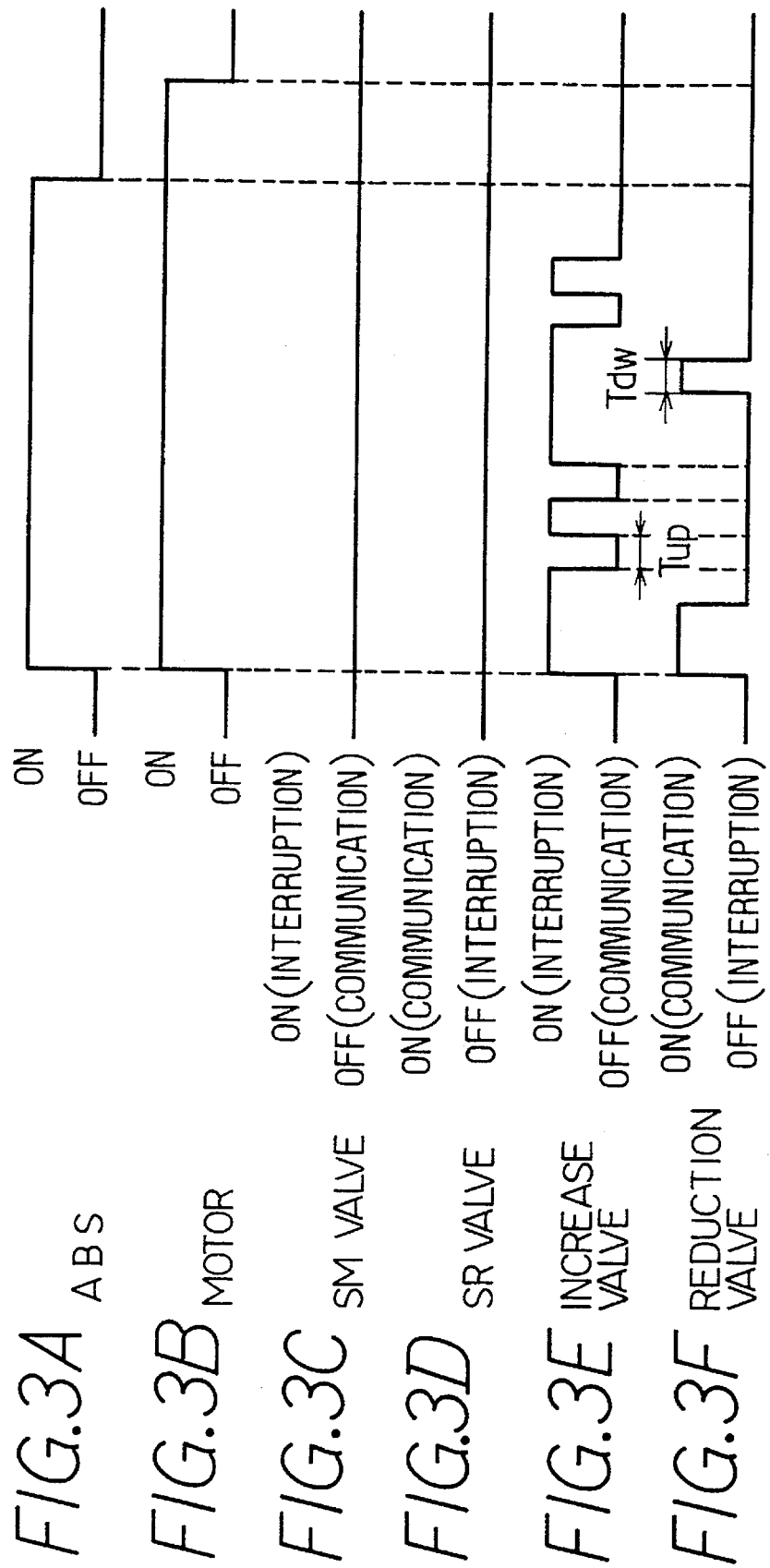
FIGS. 3A through 3F are timing charts indicating processing of ABS control according to the embodiment.
Figure 4:
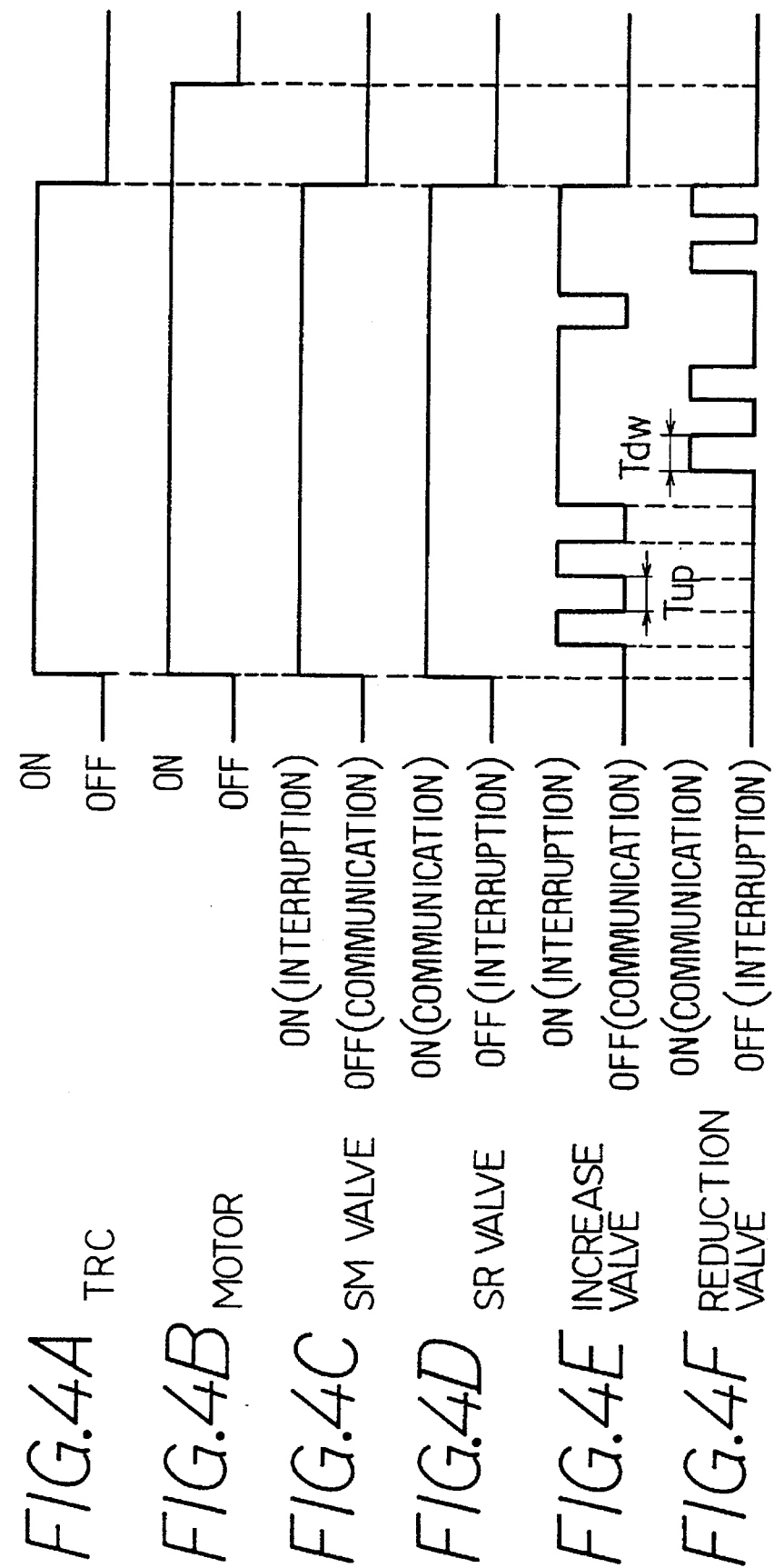
FIGS. 4A through 4F are timing charts indicating processing of TRC control according to the embodiment.

When slippage is generated at the several vehicle wheels FL to RR by sudden braking operation by a driver on, for example, a low-µ road, as shown in FIG. 3, ABS control is initiated and a pump motor 80 is driven to cause the pumps 60 and 62 to operate, and along with this, brake-fluid pressure within the respective W/Cs 2FL to 2RR is controlled by respectively switching the pressure-increasing valves 46FL to 46RR and the pressure-reducing valves 48FL to 48RR which are pressure-control valves on and off (conduction or nonconduction) in order to appropriately switch to a state of pressure reduction, holding, or pressure increasing in correspondence with a slippage state of the respective wheels FL to RR.

In specific terms, when it is determined that the vehicle wheels exhibit a tendency to lock, the pressure-control valves are controlled at a pressure-reducing position (pressure-increasing valve ON: interrupted position, pressure-reducing valve OFF: communicated position), and the hydraulic pressure of the W/Cs 2FL to 2RR is reduced to prevent locking of the vehicle wheels. At this time, the brake fluid discharged from the W/Cs 2FL to 2RR is expelled via the pressure-reducing valves 48FL and 48FR to the reservoirs 56 and 58, and moreover the brake fluid accumulated in the reservoirs 56 and 58 is returned to the path for normal braking by driving the pump motor 80.

Accordingly, when it is determined that the tendency of the vehicle wheels to lock has been eliminated, the pressure-control valves of the W/Cs 2FL to 2RR are controlled at a pressure-increasing position (pressure-increasing valve OFF: communicated position, pressure-reducing valve OFF: interrupted position), and the W/C hydraulic pressure is caused to increase. At this time, because the vehicle wheels will exhibit a tendency to lock if the W/C hydraulic pressure is caused to increase suddenly, the pressure-control valves are controlled at a holding position (pressure-increasing valve ON: interrupted position, pressure-reducing valve OFF: communicated position), and W/C hydraulic pressure is held, and locking of the vehicle wheels is prevented and stability of the vehicle is thereby assured by causing W/C hydraulic pressure to be increased gradually.

In the example of ABS control indicated in FIGS. 3A through 3F, the three states of pressure reduction, holding, and pressure increase are switched in the manner of pressure reduction→holding→pressure increase→holding→pressure increase→holding→pressure reduction→ . . . and so on. Accordingly, time for which this pressure-increasing state is continued is pressure-increase time Tup, and time for which the pressure-reducing state is continued is pressure-reduction time Tdw. This pressure-increase time Tup and pressure-reduction time Tdw will be described later.

Additionally, the pump motor 80 is driven for a predetermined interval and the brake fluid accumulated in the reservoirs 56 and 58 is pumped out after termination of ABS control in order to perform subsequent ABS control smoothly.

(2) TRC control

When acceleration slippage is generated at the driving wheels FL and FR by sudden accelerator operation by the driver on, for example, a low-µ road, E/G TRC control to suppress output torque of the internal combustion engine 10 is initiated by outputting from the brake controller 30 to the E/G controller 20 an instruction to reduce the amount of fuel injection or to retard ignition timing, and along with this, brake TRC control is initiated.

As shown in FIGS. 4A through 4F, this brake TRC control drives the pump motor 80 to cause the pumps 60 and 62 to be operated, and along with this, braking force is applied to the driving wheels FL and FR and acceleration slippage is suppressed by switching on (i.e., electrical conduction) the SM valves 50FL and 50FR and the SR valves 70FL and 70FR and switching on and off the pressure-increasing valves 46FL and 46FR and pressure-reducing valves 48FL and 48FR.

In specific terms, the pressure-increasing valves 46FL and 46FR and pressure-reducing valves 48FL and 48FR are driven so that the control state of W/C hydraulic pressure is appropriately switched to pressure reduction, holding, or pressure increasing, and acceleration slippage is suppressed.

In the example of TRC control indicated in FIGS. 4A through 4F, the three states of pressure reduction, holding, and pressure increase are switched in the manner of pressure increase→holding→pressure increase→holding→pressure increase→holding→pressure reduction→holding→ . . . and so on. Accordingly, time for which this pressure-increasing state is continued is pressure-increase time Tup, and time for which the pressure-reducing state is continued is pressure-reduction time Tdw. This pressure-increase time Tup and pressure-reduction time Tdw will be described later.

Additionally, the pump motor 80 is driven for a predetermined interval and the brake fluid accumulated in the reservoirs 56 and 58 is pumped out after termination of TRC control in order to perform normal braking operation smoothly.

Figure 5:
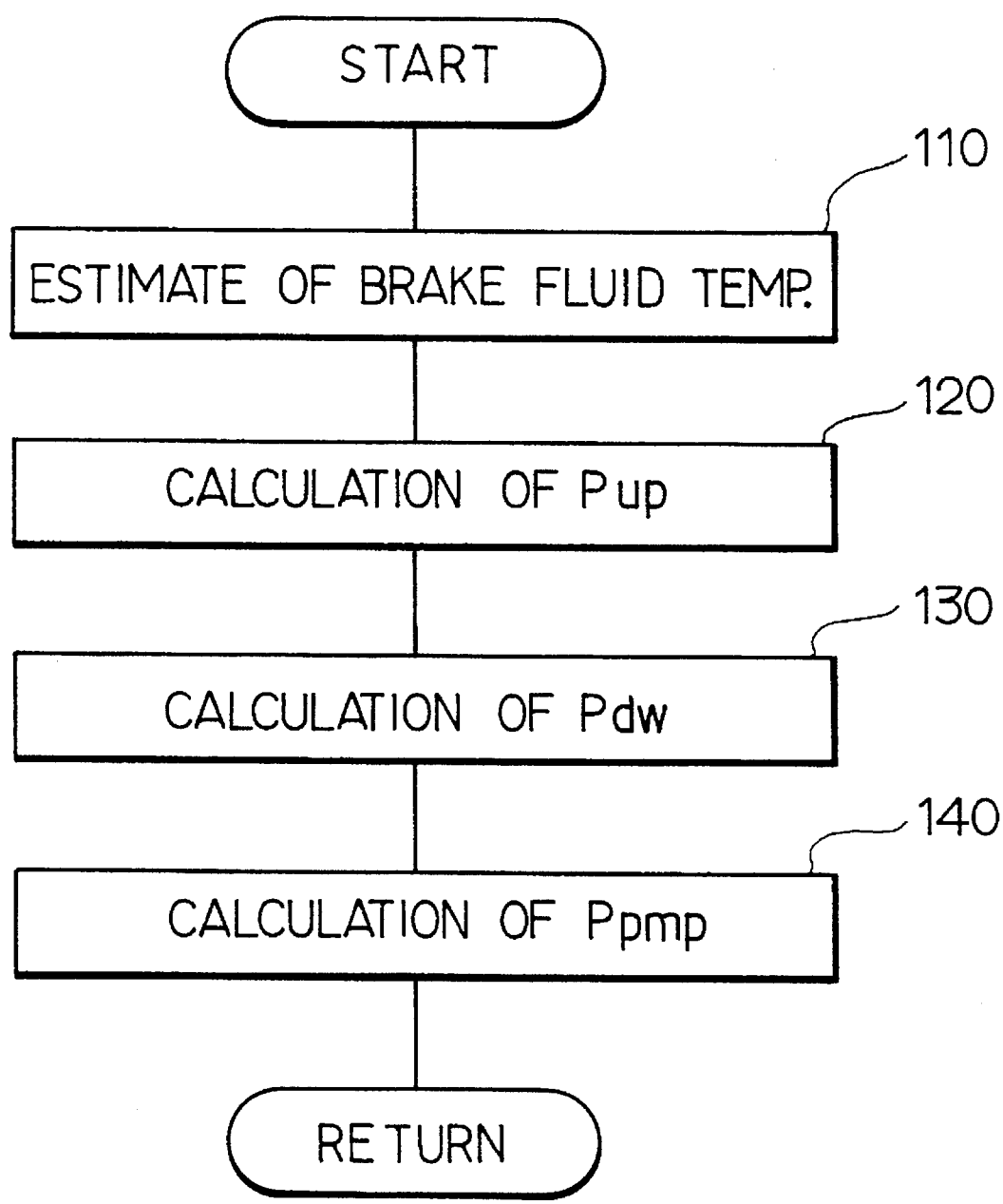
FIG. 5 is a flowchart indicating compensation-multiplier calculation processing according to the embodiment.

Processing to compensate the pressure-increase time Tup and pressure-reduction time Tdw in the above-described ABS control and TRC control will be described in detail hereinafter with reference to the flowcharts in FIGS. 5 and 6. FIG. 5 indicates processing executed for example every 5 ms to calculate a compensation multiplier, and FIG. 6 indicates processing executed for example every 1 ms to compensate the pressure-increase time Tup and pressure-reduction time Tdw employing the compensation multiplier calculated in the processing of FIG. 5.

Firstly, compensation-multiplier calculation processing will be described.

As shown in FIG. 5, initially estimation of brake-fluid temperature is performed in step 110. According to the present embodiment, brake-fluid temperature is not detected directly, rather engine coolant-water temperature is detected and brake-fluid temperature is estimated on a basis of this coolant-water temperature. Coolant-water temperature is frequently also used for other control in a vehicle, and so using the coolant-water temperature is preferred from the standpoint of joint use of data.

Accordingly, in steps 120 to 140 three compensation multipliers are calculated on a basis of this estimated brake-fluid temperature. Namely, pressure-increase gradient change ratio Pup is calculated in step 120, pressure-reduction gradient change ratio Pdw is calculated in step 130, pump-discharge gradient change quantity Ppmp is calculated in 140, and the present processing is terminated once.

These three compensation multipliers will be described additionally hereinafter. The pressure-increase gradient change ratio Pup is a compensation multiplier to obtain a hydraulic pressure-increase gradient identical to a time of normal temperature (i.e., a normal time when pump discharge capacity has not declined). As was described before, at a time of low temperature, even when brake fluid has been supplied to the wheel cylinder for a pressure-increasing time identical to when at a normal temperature, discharge capacity from the pump may drop or passage resistance of brake fluid at a needle valve may become large due to increase in viscous resistance of brake fluid or decline in battery voltage which is the drive source for the pump motor 80, and an actual amount of pressure increase of brake fluid accordingly becomes small. Consequently, to realize an amount of pressure increase identical with a time of normal temperature it is necessary to lengthen the pressure-increase time Tup, and the pressure-increase time Tup is compensated by the pressure-increase gradient change ratio Pup. In specific terms, for example, a relationship of brake-fluid temperature and the pressure-increase gradient change ratio Pup is stored in map format, and the pressure-increase gradient change ratio Pup corresponding to the brake-fluid temperature estimated in step 110 is calculated by referring the map.

Similarly, the pressure-reduction gradient change ratio Pdw is a compensation multiplier to obtain a hydraulic pressure-reduction gradient identical to a time of normal temperature. Similarly to the foregoing, at a time of low temperature, actual amount of pressure reduction of brake fluid becomes small due to increase in passage resistance of brake fluid in the needle valve and decline in discharge capacity from the pump, even when brake fluid has been expelled from the wheel cylinder for a pressure-reduction time identical to when at a normal temperature. Consequently, to realize an amount of pressure reduction identical with a time of normal temperature it is necessary to lengthen the pressure-reduction time Tdw, and the pressure-reduction time Tdw is compensated by this pressure-reduction gradient change ratio Pdw. In this case as well, it is sufficient for a correspondence relationship of brake-fluid temperature and the pressure-reduction gradient change ratio Pdw to be stored in map format.

Additionally, the pump-discharge gradient change quantity Ppmp is a compensation multiplier employed to compensate pressure-increase time Tup in TRC control, and reflects a decline in discharge capacity of the pump when at a low temperature and is established so as to obtain a discharge gradient identical to a time of normal temperature. That is to say, at a time of low temperature the discharge gradient itself of brake fluid discharged from the pump becomes smaller for the above-described reasons. Consequently, a correspondence relationship of this brake-fluid temperature and a change quantity for the discharge gradient is stored in a map format, and the pressure-increase gradient change quantity Ppmp corresponding to the brake-fluid temperature estimated in step 110 is calculated by referring the map.

To continue, processing to compensate the pressure-increase time Tup and pressure-reduction time Tdw employing the compensation multipliers calculated in the processing of FIG. 5 will be described hereinafter.

Figure 6:
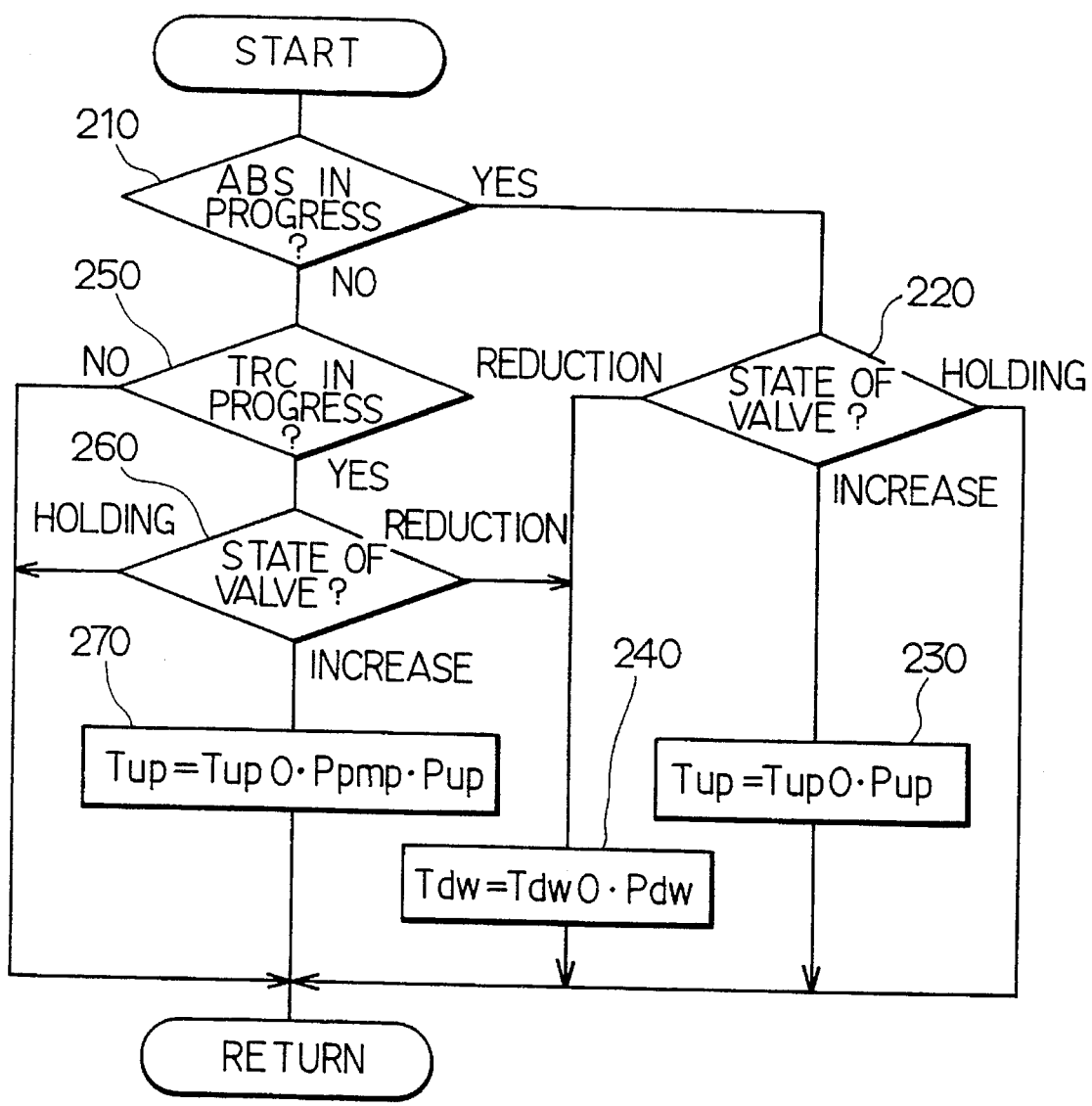
FIG. 6 is a flowchart indicating pressure-increase and pressure-reduction time compensation processing according to the embodiment.
Figure 7:
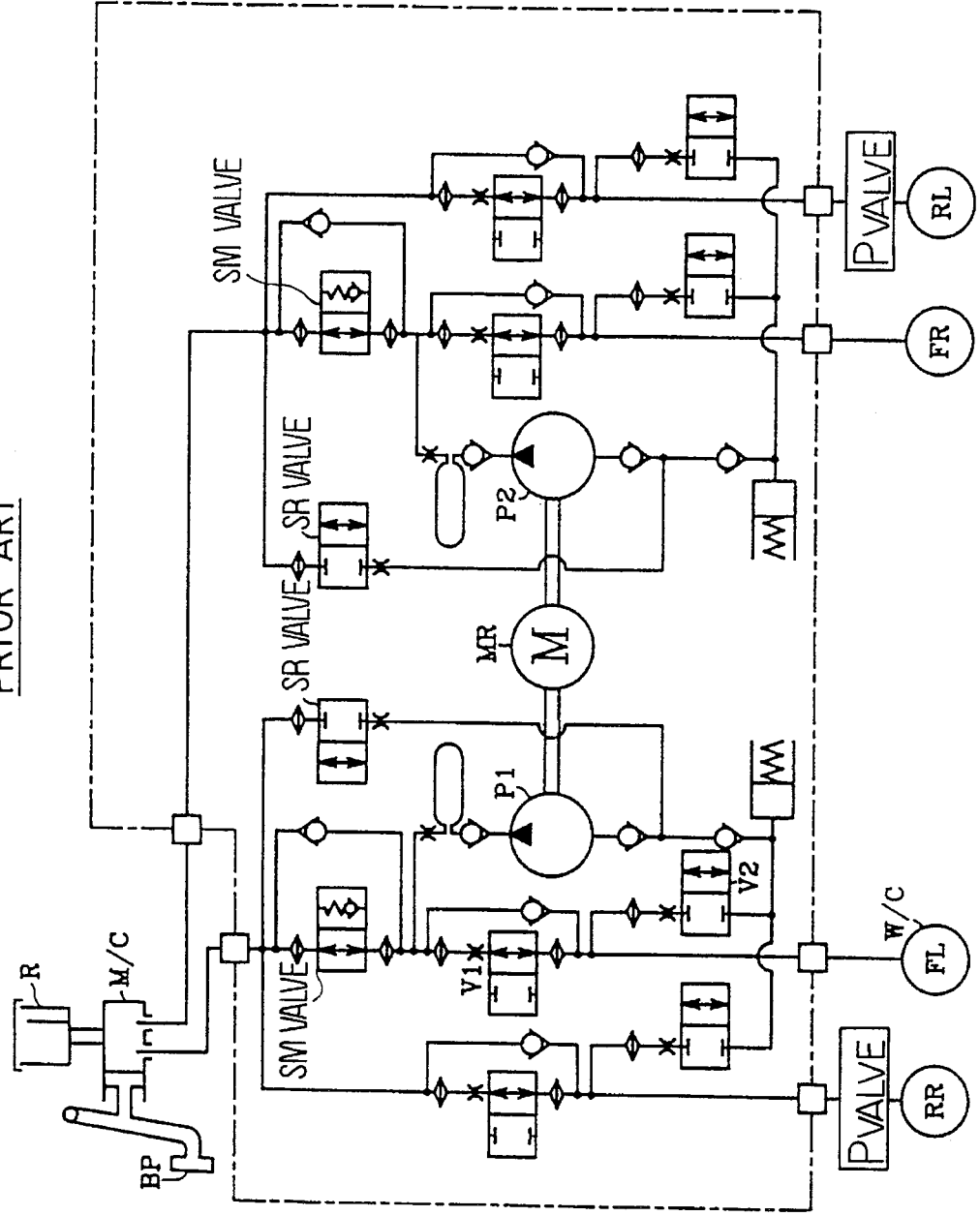
FIG. 7 is a circuit diagram indicating a hydraulic circuit according to the prior art.
Figure 8:
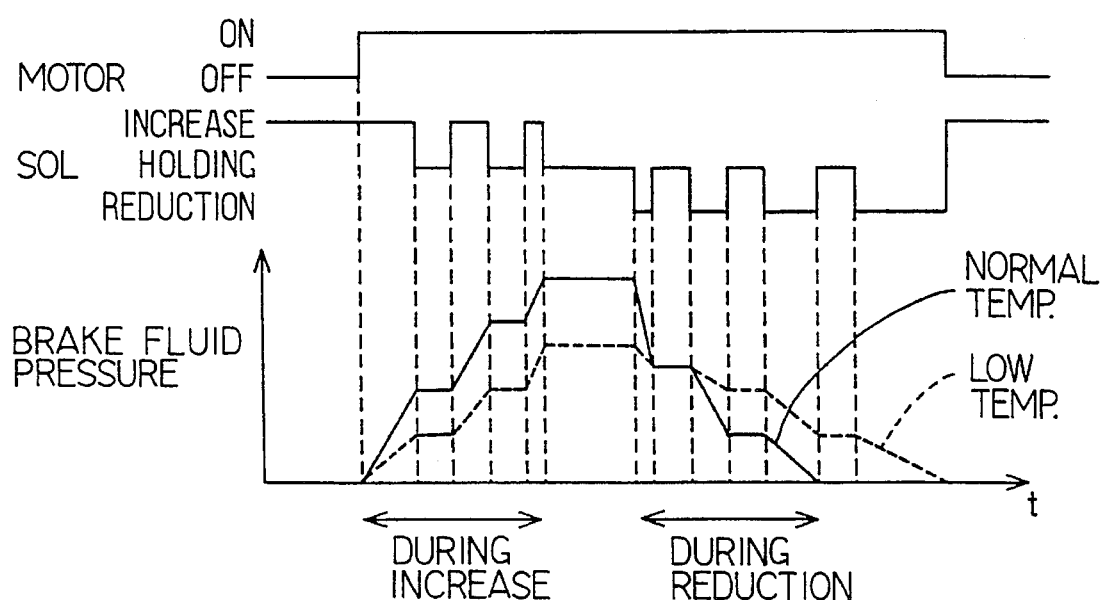
FIG. 8 is a time chart indicating problems in the prior art.

As shown in FIG. 6, initially in step 210 it is determined whether ABS control is presently in progress. If ABS control is in progress, it is determined in step 220 which of the three modes of pressure increase, holding, or pressure reduction the pressure-control valve is set to. In a case of the holding mode, the present processing is terminated once without change and with no action.

Meanwhile, in a case of the pressure-increase mode, the pressure-increase time Tup is calculated in step 230 by multiplying a pressure-increase time standard value Tup0 with the pressure-increase gradient change ratio Pup calculated in the foregoing step 120. Additionally, in a case of the pressure-reduction mode, the pressure-reduction time Tdw is calculated in step 240 by multiplying a pressure-reduction time standard value Tdw0 with the pressure-reduction gradient change ratio Pdw calculated in the foregoing step 130.

Furthermore, the pressure-increase time standard value Tup0 and pressure-reduction time standard value Tdw0 which become the basis of the above-described compensation are constants conforming to a road at a normal-temperature.

In this way, a pressure-increase time Tup or pressure-reduction time Tdw which realizes a pressure-increase gradient or pressure-reduction gradient identical with a time of normal temperature can be obtained by compensating by the pressure-increase gradient change ratio Pup or the pressure-reduction gradient change ratio Pdw. The above-described ABS control is performed employing these pressure-increase time Tup and pressure-reduction time Tdw.

Additionally, in a case of a negative determination in step 210, i.e., in a case when ABS control is not in progress, in step 250 it is determined whether TRC control is presently in progress, and if TRC control is in progress, it is determined in step 260 which of the three modes of pressure increase, holding, or pressure reduction the pressure-control valve is set to. In a case of the holding mode, the present processing is terminated once without change and with no action.

Meanwhile, in a case of the pressure-increase mode, the pressure-increase time Tup (for TRC-control use) is calculated in step 270 by multiplying a pressure-increase time standard value Tup0 with the pressure-increase gradient change ratio Pup calculated in the foregoing step 120 and the pump-discharge gradient change quantity Ppmp calculated in step 140. Additionally, in a case of the pressure-reduction mode, the pressure-reduction time Tdw is calculated in step 240 by multiplying the pressure-reduction time standard value Tdw0 with the pressure-reduction gradient change ratio Pdw, similarly to the above-described ABS control.

Furthermore, the reason that the pump-discharge gradient change quantity Ppmp is employed in compensation of the pressure-increase time Tup in TRC control is that pressure increase due to TRC control causes the W/C hydraulic pressure to be increased by only the amount of pump-discharge fluid.

In this way, the pressure-increase time is compensated by the pressure-increase gradient change ratio Pup and pump-discharge gradient change quantity Ppmp, and the pressure-reduction time Tdw is compensated by the pressure-reduction gradient change ratio Pdw. Consequently, a pressure-increase time Tup or pressure-reduction time Tdw which realizes a pressure-increase gradient or pressure-reduction gradient identical with a time of normal temperature can be obtained. The above-described TRC control is performed employing this pressure-increase time Tup or pressure-reduction time Tdw.

Additionally, in a case of a negative determination in step 250, i.e., in a case when neither ABS control nor TRC control is in progress, the present processing is terminated once without change and with no action.

In this way, according to the present embodiment, the temperature of brake fluid is estimated (step 110), and the pressure-increase gradient ratio Pup, pressure-reduction gradient change ratio Pdw, and pump-discharge gradient change quantity Ppmp established in correspondence with the amount of decline of pump-discharge capacity at this brake-fluid temperature are calculated (steps 120 to 140). These compensation multipliers Pup, Pdw, and Ppmp are for obtaining a pressure-increase gradient, pressure-reduction gradient, and pump-discharge gradient identical to a time of normal temperature (i.e., a time of normal temperature when pump-discharge capacity has not declined).

Accordingly, the pressure-increase time Tup and pressure-reduction time Tdw in ABS control and TRC control are calculated utilizing these compensation multipliers Pup, Pdw, and Ppmp. In specific terms, the pressure-increase gradient and pressure-reduction gradient become smaller at a pressure-increase time Tup and pressure-reduction time Tdw identical with a time of normal temperature, and convergence of slippage in TRC control may worsen or loss of speed due to delay in brake fluid discharge from the W/Cs may occur, and so the pressure-increase time Tup and pressure-reduction time Tdw are compensated so as to become longer than when at a normal temperature, and decline in the amount of pressure increase as well as decline in the amount of pressure reduction per unit time are supplemented. For these reasons, control performance of brake-fluid pressure similar to a time of normal temperature can be obtained, and appropriate TRC control can be performed. This is similarly the case for ABS control.

In this way, appropriate brake-fluid pressure control similar to when at a normal temperature (signifying a case where discharge capacity is normal) is performed and control performance similar to when at a normal temperature can be obtained in control such as TRC control, ABS control, and the like to control brake-fluid pressure and cause to enhance motion characteristics of a vehicle, even in a case where discharge capacity of a pump has declines such as for example when at a low temperature.

Furthermore, the present invention is in no way exclusively restricted to the above-described embodiment, and needless to say can be embodied in a variety of modes in a scope which does not depart from the intent of the present invention. For example, according to the foregoing embodiment a pressure-increasing control valve and pressure-reducing control valve were established as discrete bodies, but an integral three-way valve is also acceptable instead of two valves. Additionally, according to the foregoing embodiment a pressure-increase gradient ratio Pup, pressure-reduction gradient change ratio Pdw, and pump-discharge gradient change quantity Ppmp were calculated and a pressure-increase time Tup and pressure-reduction time Tdw were compensated, but it is also acceptable to have control maps for use at a time of low temperature and for use at a time of normal temperature, and switch these.

Furthermore, in the foregoing embodiment, the embodiment where the present invention is applied to the ABS control and TRC control was explained. However, the present invention can be applied to a vehicle motion characteristic control which controls brake fluid pressures of wheel cylinders in order to enhance a stability of the vehicle, for example, while a vehicle is turning.

What is claimed is:

1. An automotive brake fluid pressure control apparatus applied to a vehicle having a master cylinder and a wheel cylinder, comprising:

a pump disposed in a conduit connecting said master cylinder and said wheel cylinder of a vehicle wheel to discharge high-pressure brake fluid;

pressure-control valve means to switch supply of brake fluid from said pump to said wheel cylinder and expulsion of brake fluid from said wheel cylinder;

brake-fluid pressure control means for controlling switching of said pressure-control valve means to control brake-fluid pressure applied to said wheel cylinder;

detecting means for detecting a state of at least one of an increase in viscous resistance of said brake fluid and a decline in discharge capacity of said pump; and brake-fluid pressure control compensating means for compensating control for switching of said pressure-control valve means by said brake-fluid pressure control means so that at least one of supply time of brake fluid to said wheel cylinder and expulsion time of brake fluid from said wheel cylinder becomes longer when said state of at least one of the increase in viscous resistance of said brake fluid and the decline in discharge capacity of said pump has been detected by said detecting means, wherein said detecting mean is provided with brake-fluid temperature detecting means for detecting temperature of said brake fluid in order to detect said increase in viscous resistance of said brake fluid, and wherein said brake-fluid temperature detecting means is provided with engine coolant-water temperature detecting means for detecting temperature of engine coolant-water, and estimates said temperature of said brake-fluid on a basis of said temperature of said engine coolant-water detected by said engine coolant-water temperature detecting means.

2. An automotive brake fluid pressure control apparatus according to claim 1, wherein:

said brake-fluid pressure control means performs a predetermined antiskid control which is conducted by regulating brake-fluid pressure applied to wheel cylinders of several vehicle wheels during vehicle braking to prevent occurrence of excessive slippage of respective vehicle wheels.

3. An automotive brake fluid pressure control apparatus according to claim 2, wherein:

said brake-fluid pressure control means performs predetermined traction control which is conducted by regulating brake-fluid pressure applied to wheel cylinders of several vehicle wheels during vehicle acceleration to prevent occurrence of excessive slippage of respective vehicle wheels, in addition to said antiskid control.

4. An automotive brake fluid pressure control apparatus according to claim 1, wherein:

said pressure-control valve means is switched to one of three modes of pressure increasing, holding, pressure reduction;

said brake-pressure control means switches said pressure-control valve means between said pressure increasing mode and holding mode with a predetermined duty cycle to increase said brake-fluid pressure, and switches said pressure-control valve means between said pressure reduction mode and holding mode with a predetermined duty cycle to reduce said brake-fluid pressure; and said brake-pressure control compensating means compensates said duty cycle so that switching to said pressure increasing mode and/or switching to said pressure reduction mode becomes longer.

* * * * *